United States Patent [19]

Shoji

[11] Patent Number: 5,548,122

[45] Date of Patent: Aug. 20, 1996

[54] RADIATION DETECTOR

[75] Inventor: Takashi Shoji, Kanagawa-ken, Japan

[73] Assignee: Fuji Photo Film Co., Ltd., Kanagawa, Japan

[21] Appl. No.: 299,602

[22] Filed: Sep. 1, 1994

[30] Foreign Application Priority Data

Sep. 1, 1993 [JP] Japan .................................. 5-217306

[51] Int. Cl.⁶ .................................................. G01T 1/24
[52] U.S. Cl. .................................. 250/370.09; 250/370.11
[58] Field of Search ........................ 250/370.08, 370.09, 250/370.11; 378/62, 98.8

[56] References Cited

U.S. PATENT DOCUMENTS

| | | | |
|---|---|---|---|
| 4,153,839 | 5/1979 | Hounsfield et al. | 250/370.11 X |
| 4,996,413 | 2/1991 | McDaniel et al. | 250/370.09 X |
| 5,138,642 | 8/1992 | McCroskey et al. | 378/62 X |
| 5,241,576 | 8/1993 | Lonn | 250/370.09 X |
| 5,245,191 | 9/1993 | Barber et al. | 250/370.09 X |

FOREIGN PATENT DOCUMENTS

| | | |
|---|---|---|
| 59-211263 | 11/1984 | Japan . |
| 1-216290 | 8/1989 | Japan . |
| 2-164067 | 6/1990 | Japan . |
| WO9206501 | 4/1992 | WIPO . |

Primary Examiner—Carolyn E. Fields
Assistant Examiner—Edward J. Glick
Attorney, Agent, or Firm—Sughrue, Mion, Zinn, Macpeak & Seas

[57] ABSTRACT

A radiation detector comprises a plurality of solid-state photo detecting devices arrayed in a one-dimensional direction or in two-dimensional directions. The solid-state photo detecting devices detect radiation carrying image information, convert the radiation into an analog image signal, which represents the image information as a whole, and feed out the analog image signal. A logarithmic converter is located for each group of a predetermined number of the solid-state photo detecting devices. The logarithmic converter associated with each group logarithmically converts a group of image signal components of the analog image signal, which are fed out of the group of the predetermined number of the solid-state photo detecting devices, and feeds out the group of the image signal components of the logarithmically converted analog image signal.

10 Claims, 2 Drawing Sheets

RADIATION DETECTOR

BACKGROUND OF THE INVENTION

Field of the Invention

This invention relates to a radiation detector. This invention particularly relates to a radiation detector for converting radiation, which is irradiated to the radiation detector, into an image signal and producing the image signal. This invention also relates to an image signal processing method for processing the image signal fed out of the radiation detector.

Description of the Prior Art

Operations for recording radiation images are carried out in various fields. For example, radiation images used for medical purposes are recorded in X-ray image recording for medical diagnoses. Also, radiation images used for industrial purposes are recorded for non-destructive inspection of substances. In order to carry out such operations for recording radiation images, there has been previously utilized so-called "radiography" in which radiation films and intensifying screens are combined. With radiography, when radiation, such as X-rays, carrying image information of an object impinges upon the intensifying screen. A phosphor contained in the intensifying screen then absorbs energy from the radiation and produces fluorescence (i.e. instantaneously emitted light). Therefore, the radiation film, which is superposed upon the intensifying screen in is exposed to the fluorescence produced by the phosphor, and a radiation image is thereby formed on the radiation film. In this manner, the radiation image can be directly obtained as a visible image on the radiation film.

Also, techniques for photoelectrically reading out a radiation image, which has been recorded on a radiation film, in order to obtain an image signal, carrying out appropriate image processing on the image signal, and then reproducing a visible image by use of the processed image signal have previously been known in various fields. For example, an X-ray image is recorded on an X-ray film having a small gamma value chosen according to the type of image processing to be carried out. The X-ray image is read out from the X-ray film and converted into an electric signal (i.e., an image signal), and the image signal is processed and then used for reproducing the X-ray image as a visible image on a photocopy, or the like. In this manner, a visible image having good image quality with high contrast, high sharpness, high resolution, and the like, can be reproduced.

Further, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause the sheet to emit light in proportion to the amount of energy stored thereon during its exposure to the radiation. The light emitted by the stimulable phosphor sheet, upon stimulation is photoelectrically detected and converted into an electric image signal. The image signal is then processed and used for the reproduction of the radiation image of the object as a visible image on a recording material.

However, in order for a radiation image to be obtained with the radiographic system described above, when the radiation image is to be directly formed as a visible image, it is necessary to carry out the image recording operation such that the sensitivity regions of the radiation film and the intensifying screen used in the image recording operation may coincide with each other.

Also, with the aforesaid system wherein the radiation image recorded on the radiation film or the stimulable phosphor sheet is photoelectrically read out, the image processing must be carried out on the radiation image in order to adjust the radiation image for a desired image density and a desired contrast. Further, the radiation image must be converted into an electric signal. For this reason, a scanning operation for reading out the radiation image must be carried out by using an image read-out apparatus. Therefore, the operation for obtaining the radiation image becomes complicated, and a long time is required to obtain the radiation image.

Accordingly, in order to solve the aforesaid problems of the conventional systems, radiation detectors have been proposed in, for example, Japanese Unexamined Patent Publication Nos. 59(1984)-211263 and 2(1990)-164067, PCT Patent Publication WO92/06501, and "Signal, Noise, and Read Out Considerations in the Development of Amorphous Silicon Photodiode Arrays for Radiotherapy and Diagnostic X-ray Imaging," L. E. Antonuk et al., University of Michigan, R. A. Street Xerox, PARC, SPIE Vol. 1443, Medical Imaging V; Image Physics (1991), pp. 108–119.

The radiation detector comprises a solid-state photodetector and a scintillator, which is overlaid on the solid-state photodetector and converts radiation into visible light. The solid-state photodetector comprises a substrate, which may be constituted of, for example, quartz glass having a thickness of 3 mm, and a plurality of solid-state photo detecting devices which are located in a matrix-like pattern on the substrate. Each of the solid-state photo detecting devices is comprises of a transparent conductive film, a conductive film, and an amorphous semiconductor film between the conductive films. The solid-state photodetector also comprises a plurality of signal conductors and a plurality of scan conductors, which extend in a matrix-like pattern so as to intersect perpendicularly to each other.

The radiation detector is located such that the scintillator stands facing the side of incident radiation. In this state, radiation carrying image information of an object is irradiated to the radiation detector. The radiation impinges directly upon the scintillator and is converted by the scintillator into visible light. The visible light is then detected by a photoelectric conversion means of each of the solid-state photo detecting devices and converted into an analog image signal, which represents the radiation image of the object. To keep the processing efficiency high, a group of image signal components of the analog image signal, which are obtained a plurality of groups of a predetermined number of solid-state photo detecting devices, are converted into a group of image signal components of a digital image signal. The digital image signal, thus obtained, is subjected to logarithmic conversion and predetermined image processing. The image signal obtained from the image processing is then fed into an image reproduction means, such as a cathode ray tube (CRT) display device, and used for the reproduction of a visible image. With the radiation detector, the radiation image of the object can be reproduced immediately without complicated operations. Therefore, a visible radiation image can be obtained immediately in the real time mode, and the drawbacks of the radiographic system described above can be eliminated.

Also, radiation detectors having no scintillator and directly detecting radiation have been proposed. Examples of such radiation detectors include the following:

(i) A solid-state photodetector having a thickness approximately 10 times as large as the ordinary thickness, which thickness is taken in the direction along which radiation is transmitted. The solid-state photodetector is described in, for example, "Material Parameters in Thick Hydrogenated Amorphous Silicon Radiation Detectors," Lawrence Berkeley Laboratory, University of California, Berkeley, Calif. 94720 Xerox Parc. Palo Alto. Calif. 94304.

(ii) A solid-state photodetector comprising two or more layers overlaid via a metal plate with respect to the direction along which radiation is transmitted. The solid-state photodetector is described in, for example, "Metal/Amorphous Silicon Multilayer Radiation Detectors, IEE TRANSACTIONS ON NUCLEAR SCIENCE, Vol. 36, No. 2, April 1989.

(iii) A radiation detector comprising a semiconductor, such as CdTe. The radiation detector is proposed in, for example, Japanese Unexamined Patent Publication No. 1(1989)-216290. With these radiation detectors, no scintillator is used, and radiation is directly detected and converted into an electric signal, or the like. As with the case of radiation detectors utilizing scintillators, the radiation detectors utilizing no scintillator can also eliminate the drawbacks of the conventional systems.

However, with the radiation detectors described above, an analog image signal is converted into a digital image signal, and the digital image signal is then subjected to the logarithmic conversion. Therefore, in cases where an image density proportional to logarithmic values of incident radiation energy is to be obtained, in images for medical purposes, quantization noise, which occurs when digital conversion is carried out, increases due to the logarithmic. As a result, resolution on the low energy side of radiation becomes low.

Further, in cases where an image signal generated by one of the radiation detectors described above is processed, the processing has heretofore been carried out with a signal processing means, which is independent of the radiation detector. Therefore, noise enters into the image signal while the image signal is being transmitted from the radiation detector to the signal processing means. As a result, the signal-to-noise (S/N) ratio of an image reproduced from the image signal becomes low.

SUMMARY OF THE INVENTION

The primary object of the present invention is to provide a radiation detector, which converts radiation into an image signal such that an image having a high resolution and a high S/N ratio can be reproduced from the image signal.

Another object of the present invention is to provide an image signal processing method, wherein an image signal fed out of a radiation detector is processed such that an image having a high resolution and a high S/N ratio can be reproduced from the processed image signal.

The present invention provides a radiation detector comprising a plurality of solid-state photo detecting devices arrayed in a one-dimensional direction or in two-dimensional directions. The solid-state photo detect devices detecting radiation, which carries image information, convert the radiation into an analog image signal, which represents the image information as a whole, and feed out the analog image signal. The radiation detector further comprises the provision of one or more a logarithmic conversion means, which are located for each group of a predetermined number of the solid-state photo detecting devices. The logarithmic conversion means logarithmically converts a group of image signal components of the analog image signal, which are fed out of the group of the predetermined number of the solid-state photo detecting devices, and produces the group of the image signal components of the logarithmically converted analog image signal.

The radiation detector in accordance with the present invention may be comprised of a scintillator, which converts radiation carrying image information into visible light, and the solid-state photodetector, which is comprised of the plurality of the solid-state photo detecting devices and is overlaid upon the scintillator. The solid-state photodetector detects the visible light generated by respective portions of the scintillator, photoelectrically converts the visible light into an image signal representing the image information, and feeds out the image signal. Alternatively, the radiation detector in accordance with the present invention may have no scintillator, and the plurality of the solid-state photo detecting devices of the radiation detector may directly detect radiation and may feed out the image signal.

The solid-state photo detecting devices of the radiation detector in accordance with the present invention are capable of detecting the visible light, which has been generated by the scintillator, or are capable of detecting the radiation, which directly impinges upon the solid-state photo detecting devices.

The state, in which the radiation is being detected, embraces the state in which the radiation is being irradiated to the radiation detector.

The group of the predetermined number of the solid-state photo detecting devices may be constituted of the predetermined number of the solid-state photo detecting devices, which are among the plurality of the solid-state photo detecting devices constituting the radiation detector. Alternatively, the group of the predetermined number of the solid-state photo detecting devices may be constituted of all of the solid-state photo detecting devices constituting the radiation detector.

The present invention also provides an image signal processing method for processing an analog image signal, which has been fed out of a radiation detector comprising a plurality of solid-state photo detecting devices arrayed in a one-dimensional direction or in two-dimensional directions. The solid-state photo detecting devices detect radiation, which carries image information, convert the radiation into the analog image signal, which represents the image information as a whole, and feed out the analog image signal, the method comprising the steps of:
  i) logarithmically converting the analog image signal, which has been fed out of the radiation detector, in units of a group of image signal components of the analog image signal, which are fed out of a group of a predetermined number of the solid-state photo detecting devices, and
  ii) converting the analog image signal, which has thus been logarithmically converted, into a digital image signal, the digital image signal being thereafter fed out.

The radiation detector in accordance with the present invention is provided with the means for logarithmically converting the analog image signal. Therefore, with the radiation detector in accordance with the present invention, the image signal components of the analog image signal, which have been fed out of the respective solid-state photo detecting devices, are immediately converted logarithmically. The logarithmically converted image signal is fed out of the radiation detector. Accordingly, the dynamic range and the S/N ratio of the reproduced image can be prevented from adverse effects due to noise, which will enter into the signal before the signal is converted logarithmically.

With the image signal processing method in accordance with the present invention, wherein the image signal fed out of the radiation detector is processed, the analog image signal having been fed out of the radiation detector is converted logarithmically, and Thereafter, the analog image signal having been converted logarithmically, is converted into the digital image signal. Therefore, the image signal processing method in accordance with the present invention can prevent the problems, where an image density proportional to logarithmic values of incident radiation energy is to be obtained, as in images for medical purposes, quantization noise due to digital conversion increases due to the logarithmic conversion. Accordingly, the resolution on the low energy side of radiation can be prevented from becoming low, and an image having good image quality can be obtained.

DESCRIPTION OF THE PREFERRED EMBODIMENTS

The present invention will hereinbelow be described in further detail with reference to the accompanying drawings.

Figure 1:
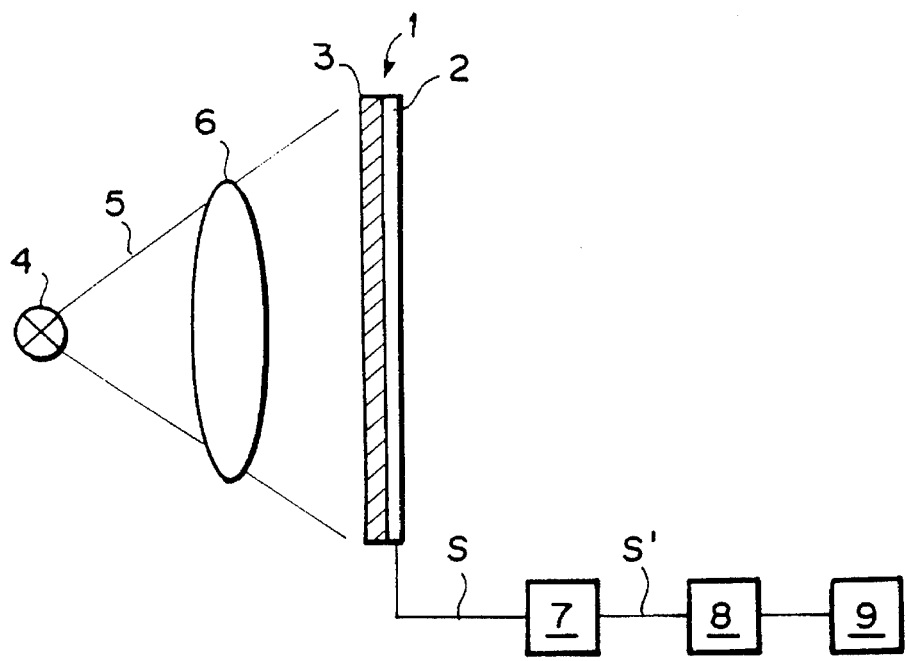
FIG. 1 is a schematic view showing an image signal detecting system, wherein an embodiment of the radiation detector in accordance with the present invention is employed.

FIG. 1 is a schematic view showing an image signal detecting system, wherein an embodiment of the radiation detector in accordance with the present invention is employed. As illustrated in FIG. 1, a radiation detector 1 comprises a scintillator 3, which converts the incident radiation into visible light, and a solid-state photodetector 2, which detects the visible light having been generated by the scintillator 3. The photodectors 2 photoelectrically converts the visible light into an image signal representing a radiation image of an object 6.

Figure 2:
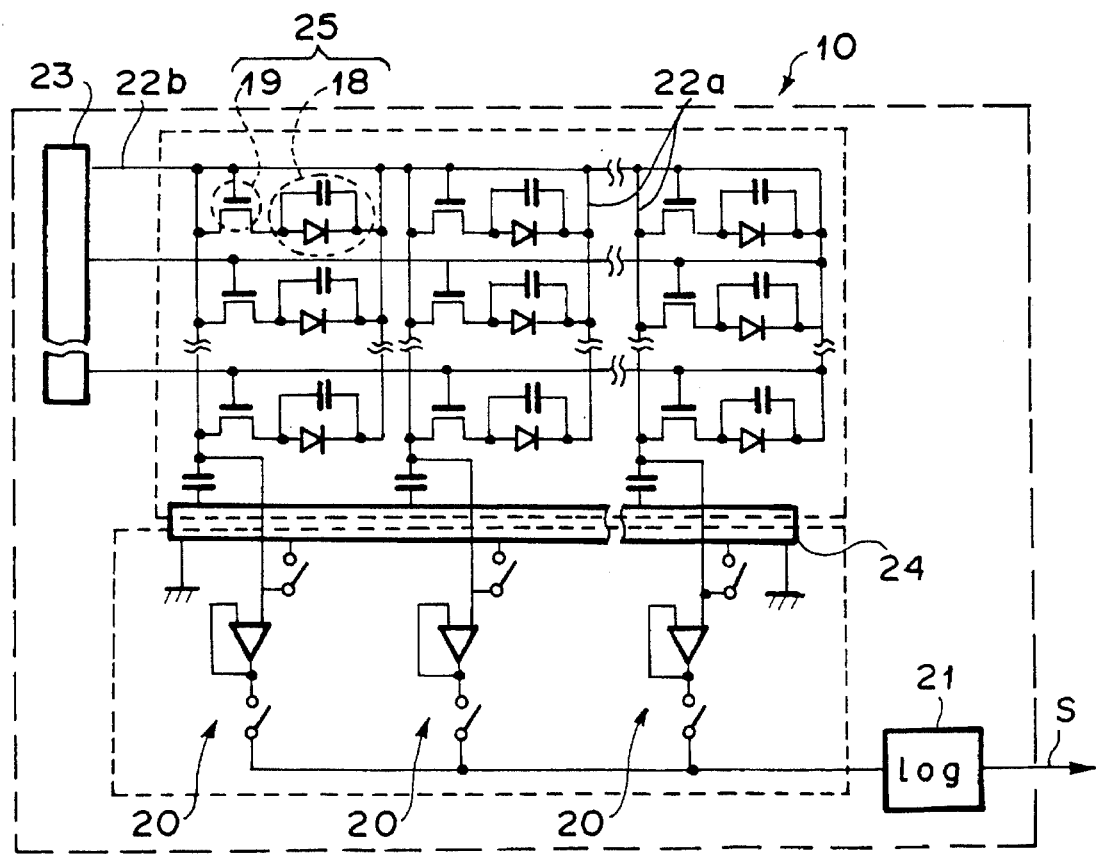
FIG. 2 is a schematic view showing a group of a predetermined number of solid-state photo detecting devices.
Figure 3:
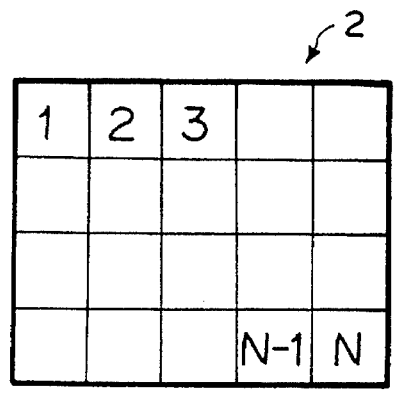
FIG. 3 is an explanatory view showing a solid-state photodetector, which is constituted of a plurality of solid-state photo detecting device groups arrayed in two-dimensional directions.

The solid-state photodetector 2, which is shown in FIG. 1, comprises N number of solid-state photo detecting device groups 10, 10, . . . , one of which is shown in FIG. 2. As illustrated in FIG. 2, each solid-state photo detecting device group 10 comprises a plurality of solid-state photo detecting devices 25, 25, . . . which are arrayed in two-dimensional directions. Each solid-state photo detecting device 25 is comprised of a photoelectric conversion means 18, which photoelectrically converts visible light into an analog image signal, and a transfer means 19, which temporarily stores the image signal generated by the photoelectric conversion means 18. As illustrated in FIG. 3, N number of the solid-state photo detecting device groups 10, 10, . . . are arrayed in two-dimensional directions. Each solid-state photo detecting device group 10 is also provided with a plurality of amplifiers 20, 20, . . . Each of the amplifiers 20, 20, . . . amplifies the image signal, which is fed out of the solid-state photo detecting devices 25, 25, . . . located along a single column of the array of the solid-state photo detecting devices 25, 25, . . . The amplifiers 20, 20, . . . are associated with a logarithmic conversion means 21, which logarithmically converts the analog image signal fed out of the solid-state photo detecting devices 25, 25, . . .

As illustrated in FIG. 2, the solid-state photo detecting devices 25, 25, . . . are connected by signal conductors 22a, 22a, . . . and scan conductors 22b, 22b, . . . The signal conductors 22a, 22a, . . . extend vertically in FIG. 2 and are connected to the solid-state photo detecting devices 25, 25, . . . and a multiplexer 24. The scan conductors 22b, 22b, . . . extend horizontally in FIG. 2 and are connected to the transfer means 19, 19, . . . of the solid-state photo detecting devices 25, 25, . . . and a scan pulse generator 23.

Figure 4:
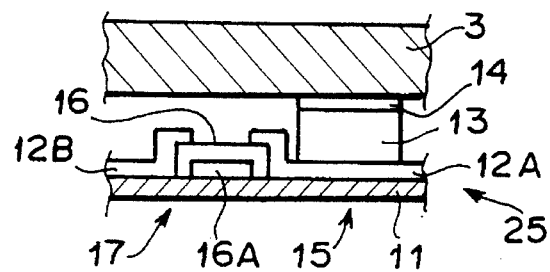
FIG. 4 is a sectional view showing a solid-state photo detecting device.

How each solid-state photo detecting device 25 is constructed will be described hereinbelow with reference to FIG. 4. As illustrated in FIG. 4, the solid-state photo detecting device 25 comprises signal conductors 12A and 12B, which are constituted of a conductive film overlaid with a pattern forming technique on a substrate 11 constituted of a resin sheet. The solid-state photo detecting device 25 also comprises a photodiode 15, which is constituted of an amorphous silicon 13 and a transparent electrode 14 and which serves as the photoelectric conversion means 18. The solid-state photo detecting device 25 further comprises a thin-film transistor 17, which is comprised of an amorphous silicon 16 and a transfer electrode (gate) 16A formed in the region inside of the amorphous silicon 16 and which serves as the transfer means 19. The signal conductor 12B serves as a drain and is connected to the signal conductor 22a described above. The transfer electrode 16A is connected to the scan conductor 22b. The plurality of the solid-state photo detecting devices 25, 25, . . . having the structure described above are arrayed in two-dimensional directions, and the solid-state photo detecting device group 10 is thereby constituted. Also, the plurality of the solid-state photo detecting device groups 10, 10, . . . are arrayed in two-dimensional directions, and the solid-state photodetector 2 is thereby obtained. The solid-state photodetector 2 is overlaid upon the scintillator 3, which may be comprised of a phosphor, such as $Gd_2O_2S$ or CsI. In this manner, the radiation detector 1 is obtained.

How the image signal detecting system shown in FIG. 1 operates will be described hereinbelow.

As illustrated in FIG. 1, X-rays 5 are produced by an X-ray source 4. The X-rays 5 are irradiated to the object 6 and pass through the object. The X-rays 5, which have passed through the object 6, are irradiated to the radiation detector 1. The X-rays 5, which have been irradiated to the radiation detector 1, impinge upon the scintillator 3 and are converted into visible light. The visible light, which has thus been generated by the scintillator 3, is received by the photodiode 15, which serves as the photoelectric conversion means 18 of each of the solid-state photo detecting devices 25, 25, . . . comprising the solid-state photodetector 2. As a result, signal charges are generated in the photodiode 15. In this manner, the signal charges proportional to the luminance of the visible light, i.e. to the intensity of the incident radiation, are generated in each of the solid-state photo detecting devices 25, 25, . . .

Thereafter, a transfer pulse is fed from the scan pulse generator 23 to each of the solid-state photo detecting devices 25, 25, . . . , which are located along the top row in FIG. 2. As a result, the switch of the transfer means 19 of each of the solid-state photo detecting devices 25, 25, . . . , which are, located along the top row in FIG. 2, is set to the on state. (In the on state, a voltage is applied across the transfer electrode 16A of each solid-state photo detecting device 25, and a current flows between the signal conductors 12A and 12B.) Specifically, the signal charges, which have been generated in the photodiode 15, are transferred through the thin-film transistor 17, which serves as the transfer means 19. In this manner, the signal charges having been generated in the solid-state photo detecting devices 25, 25, . . . , which are located along the top row in FIG. 2, are simultaneously fed into the multiplexer 24. The image signal components of the analog image signal (i.e. the image signal), which have been transferred from the respective solid-state photo detecting devices 25, 25, . . . , are sequentially taken up from the multiplexer 24, amplified by the amplifiers 20, 20, . . . , and then fed into the logarithmic conversion means 21.

In the logarithmic conversion means 21, the image signal components of the analog image signal are converted logarithmically. The image signal components of the logarithmically converted image signal S are fed out of the radiation detector 1.

In this manner, transfer pulses are sequentially fed from the scan pulse generator 23 to each row of the solid-state photo detecting devices 25, 25, . . . in the order of the top row, the second top row, . . . , the bottom row. The image signal components of the analog image signal, which have been transferred from each row of the solid-state photo detecting devices 25, 25, . . . , are fed into the logarithmic conversion means 21. The image signal components of the logarithmically converted image signal S are then sequentially fed out of the radiation detector 1.

The process described above is carried out for each of N number of the solid-state photo detecting device groups 10, 10, . . . , which are arrayed in the pattern shown in FIG. 3. The image signal S thus fed out of the solid-state photo detecting device groups 10, 10, . . . is fed into an analog-to-digital conversion means 7 and converted thereby into a digital image signal S'. The digital image signal S' is then fed into an image processing means 8 and subjected to image processing. The image signal, which has been obtained from the image processing, is fed into an image reproducing means 9 and used for the production of a visible image.

As described above, the radiation detector in accordance with the present invention is provided with the means for logarithmically converting the analog image signal. Therefore, the analog image signal, which has been fed out of the respective solid-state photo detecting devices, is immediately converted The logarithmically converted image signal is fed out of the radiation detector. Accordingly, the dynamic range and the S/N ratio of the reproduced image can be prevented from being adversely effected due to noise, which will enter into the signal before the signal is converted logarithmically.

The image reproducing means 8 may be, for example, an electronic display device, such as a CRT display device, a video printer for recording the radiation image displayed on a CRT display device, or the like. The radiation image of the object 6 may be recorded on a magnetic tape, an optical disk, or the like.

An embodiment of the image signal processing method in accordance with the present invention will be described hereinbelow.

Figure 5:
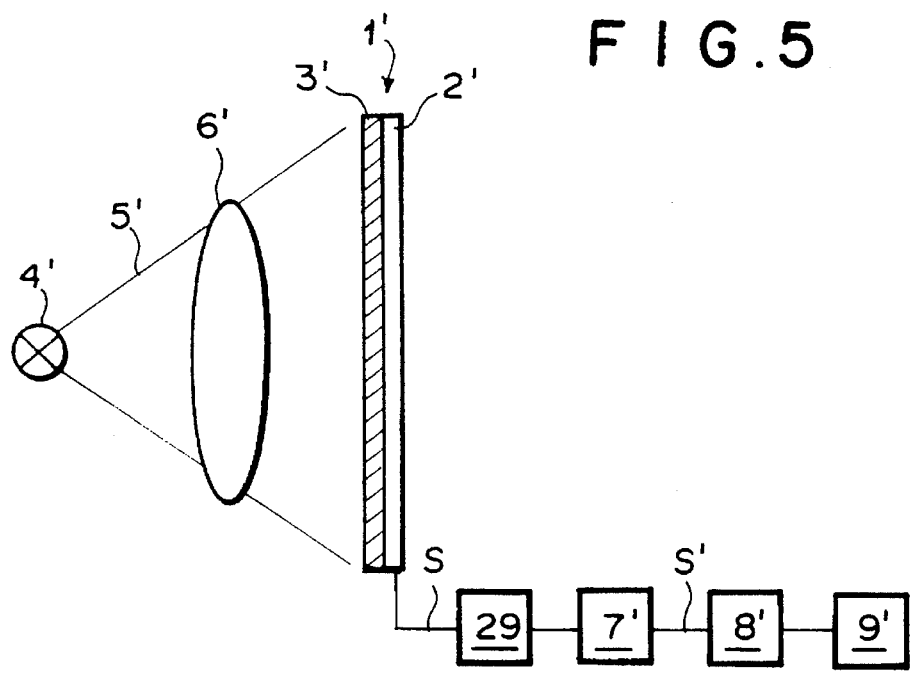
FIG. 5 is a schematic view showing how a system for carrying out the image signal processing method in accordance with the present invention operates.

FIG. 5 is a schematic view showing how a system for carrying out the image signal processing method in accordance with how the present invention operates. In FIG. 5, similar elements are numbered with corresponding primed reference numerals with respect to FIG. 1.

As illustrated in FIG. 5, in the system for carrying out the image signal processing method in accordance with the present invention, as in the embodiment shown in FIG. 1, X-rays 5' are produced by an X-ray source 4'. The X-rays 5' are irradiated to an object 6' and pass through the object. The X-rays 5', which have passed through the object 6', are irradiated to a radiation detector 1'. The X-rays 5', which have been irradiated to the radiation detector 1', impinge upon a scintillator 3' and are converted thereby into visible light. The visible light, which has thus been generated by the scintillator 3', is received by the solid-state photo detecting devices, which comprises a solid-state photodetector 2'. In this manner, an analog image signal proportional to the luminance of the visible light, i.e. to the intensity of the incident radiation, is generated.

The image signal S, which has thus been fed out of the radiation detector 1', is fed into a logarithmic conversion means 29 shown in FIG. 5 and is thereby converted logarithmically. The image signal S, which has thus been converted logarithmically, is then fed into an analog-to-digital conversion means 7' and is thereby converted into a digital image signal S'. The digital image signal S' is then fed into an image processing means 8' and is subjected to image processing. The digital image signal S', which has been obtained from the image processing, is fed into an image reproducing means 9' and is used for the reproduction of a visible image.

In the manner described above, the image signal S, which has been fed out of the radiation detector 1', is converted logarithmically and is thereafter subjected to the analog-to-digital conversion. Therefore, the problems can be prevented where quantization noise increases due to the logarithmic conversion of the digital signal. Accordingly, a reproduced image having a high S/N ratio and good image quality can be obtained.

In the image signal detecting system wherein the embodiment of the radiation detector 1 shown in FIG. 1 is utilized, the image signal S, which has been fed out of the solid-state photo detecting device groups 10, 10, . . . , each being comprised of the predetermined number of the solid-state photo detecting devices 25, 25, . . . , is fed into the single analog-to-digital conversion means 7 and converted into the digital image signal S'. Alternatively, the analog-to-digital conversion may be carried out for each of the solid-state photo detecting device groups 10, 10, . . . Also, in the embodiment of the image signal processing method shown in FIG. 5', the image signal S, which has been fed out of the radiation detector 1', is fed into the single logarithmic conversion means 29 and subjected to the logarithmic conversion. Alternatively, the solid-state photo detecting devices comprising the solid-state photodetector 2' may be divided into a plurality of groups of the solid-state photo detecting devices, and the logarithmic conversion means and the analog-to-digital conversion means may be located for each of the solid-state photo detecting device groups.

Also, in the embodiments described above, the amorphous silicon layers are utilized as the semiconductor layers. Alternatively, any of other types of semiconductor layers may be utilized.

Further, in the embodiments described above, the radiation detector comprised of the combination of the scintillator and the solid-state photodetector is utilized. Alternatively, a radiation detector as disclosed in, for example, Japanese Unexamined Patent Publication No. 1(1989)-216290 may be utilized which has no scintillator and which directly detects and photoelectrically converts radiation into an image signal.

Furthermore, in the embodiment of the radiation detector shown in FIG. 1, the plurality of the solid-state photo detecting devices 25, 25, ... are divided into a predetermined number of the solid-state photo detecting device groups 10, 10, ... The logarithmic conversion means 21 is located for each of the solid-state photo detecting device groups 10, 10, ... in order to carry out the logarithmic conversion of the image signal components of the image signal, which are obtained from each of the solid-state photo detecting device groups 10, 10, ... Alternatively, instead of the plurality of the solid-state photo detecting devices being divided into a predetermined number of the solid-state photo detecting device groups, the image signal made up of the image signal components, which are fed out of all of the solid-state photo detecting devices, may be logarithmically converted by a single logarithmic conversion means.

In the embodiments described above, the solid-state photodetector is comprised of the solid-state photo detecting devices which are arrayed in two-dimensional directions. Alternatively, a solid-state photodetector may be comprised of solid-state photo detecting devices which are arrayed in a one-dimensional direction.

In the embodiments described above, the radiation detector and the image signal processing method in accordance with the present invention are utilized when the radiation, which has passed through the object, is detected, and the radiation image of the object is thereby obtained. The radiation detector and the image signal processing method in accordance with the present invention are also applicable to, for example, the autoradiography wherein radiation emitted by a sample itself is detected, and a radiation image of the sample is thereby obtained.

What is claimed is:

1. A radiation detector comprising:

a plurality of solid-state photo detecting devices arrayed in one or two dimensions; said photodetecting devices including a plurality of photoelectric conversion means and transfer means for temporarily storing image signal information for said photoelectric conversion means; wherein the solid-state photo detecting devices detect radiation, carrying image information, convert the radiation into an analog image signal, which represents the image information as a whole and output the analog image signal, and;

at least one logarithmic conversion means, said logarithmic conversion means being arranged for each group of a predetermined number of the solid state photo detecting devices and converting a group of image signal components of the analog image signal, which are fed out of the group of the predetermined number of the solid-state photo detecting devices, and outputting the group of the image signal components of the logarithmically converted analog image signal.

2. A radiation detector as defined in claim 1 wherein the radiation detector is comprised of:

a scintillator, which converts the radiation carrying the image information into visible light and;

a solid-state photodetector, which is further comprised of the plurality of the solid-state photo detecting devices and is overlaid upon the scintillator, the solid-state photodetector detecting the visible light generated by respective portions of the scintillator, and photoelectrically converting the visible light into the analog image signal representing the image information.

3. A radiation detector as defined in claim 1 wherein the plurality of the solid-state photo detecting devices of the radiation detector directly detect the radiation carrying the image information and feed out the analog image signal.

4. A radiation detector as defined in claim 1 wherein the group of the predetermined number of the solid-state photo detecting devices is comprised of all of the solid-state photo detecting devices constituting the radiation detector.

5. A radiation detector of claim 1, wherein said logarithmic conversion means and said photodetecting devices are located on the same substrate.

6. An image signal processing method for processing an analog image signal, which has been produced by a radiation detector comprising:

a plurality of solid-state photo detecting devices arrayed in one or two dimensions; said photodetecting devices including a plurality of photoelectric conversion means; and transfer means for temporarily storing image signal information for said photoelectric conversions means; wherein the solid-state photo detecting devices detect radiation carrying image information, convert the radiation into the analog image signal, which represents the image information as a whole, and output the analog image signal, the method comprising the steps of:
   i) logarithmically converting the analog image signal, which has been produced by the radiation detector, in units of a group of image signal components of the analog image signal, which are produced by a group of a predetermined number of the solid-state photo detecting devices and
   ii) converting the analog image signal, which has thus been logarithmically converted, into a digital image signal, the digital image signal being thereafter output.

7. An image signal processing method as defined in claim 6 wherein the radiation detector is comprised of:

a scintillator, which converts the radiation carrying the image information into visible light and;

a solid-state photodectors, which is comprised of the plurality of the solid-state photo detecting devices and is overlaid upon the scintillator, the solid-state photodetector detecting the visible light generated by respective portions of the scintillator, and photoelectrically converting the visible light into the analog image signal representing the image formation.

8. An image signal processing method as defined in claim 6 wherein the plurality of the solid-state photo detecting devices of the radiation detector directly detect the radiation carrying the image information and feed out the analog image signal.

9. An image signal processing method as defined in claim 6 wherein the group of the predetermined number of the solid-state photo detecting devices is comprised of all of the solid-state photo detecting devices constituting the radiation detector.

10. An image signal processing method as defined in claim 6 wherein the radiation detector is comprised of:

a scintillator, which converts the radiation carrying the image formation into visible light;

a solid-state photodetector, which is comprised of the plurality of the solid-state photo detecting devices and is overlaid upon the scintillator, the solid-state photodetector detecting the visible light generated by respective portions of the scintillator, and photoelectrically converting the visible light into the analog image signal representing the image formation; and a logarithmic converter, wherein said logarithmic converter and said photodetecting devices are located on the same substrate.

* * * * *